United States Patent Office 3,555,603
Patented Jan. 19, 1971

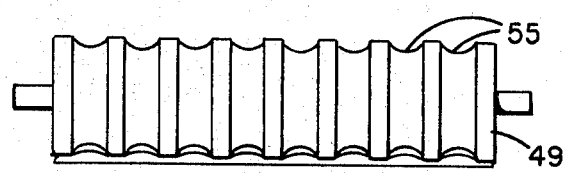
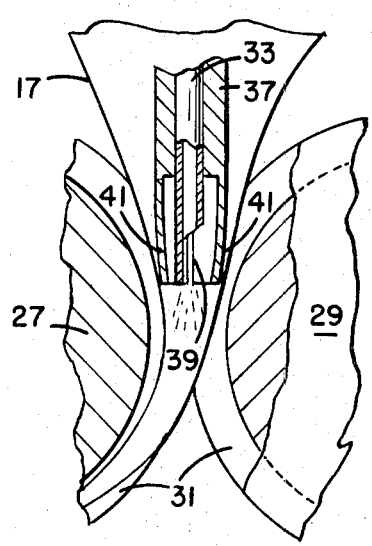
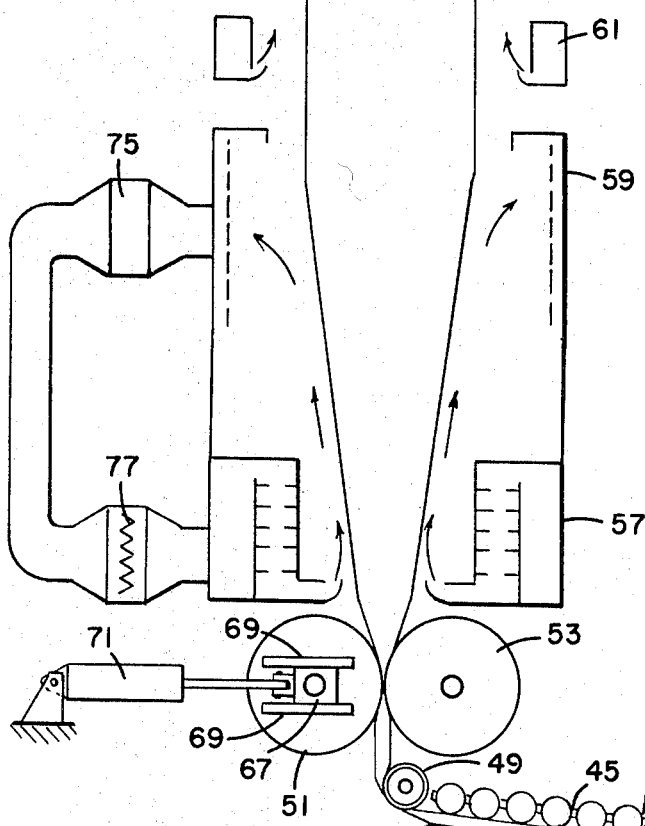
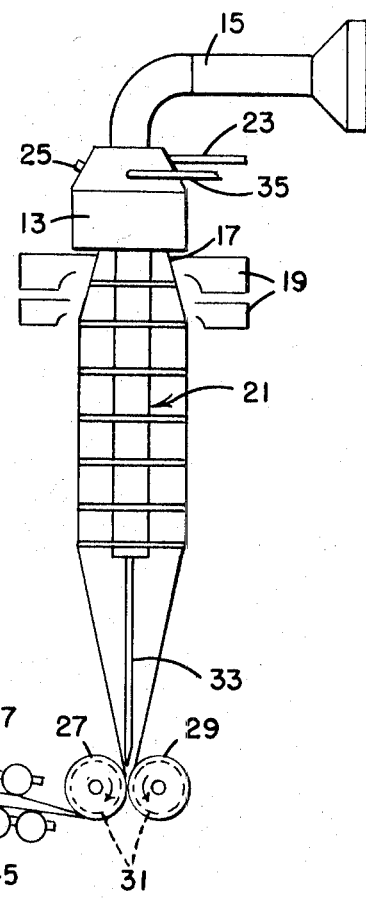

3,555,603
TUBULAR FILM MANUFACTURING APPARATUS
Harold A. Haley, Media, Pa., assignor to FMC Corporation, Philadelphia, Pa., a corporation of Delaware
Filed Aug. 30, 1968, Ser. No. 756,626
Int. Cl. B29d 23/05, 23/10
U.S. Cl. 18—14                                    8 Claims

ABSTRACT OF THE DISCLOSURE

Apparatus for introducing a gaseous medium into an advancing, continuous tubular film of thermoplastic polymeric material for use in expanding and orienting the same.

---

The present invention is directed to an apparatus for use in inflating and orienting a tubular film of thermoplastic polymeric material.

In one method of manufacturing a tubular film, molten thermoplastic polymeric material is extruded through an annular die orifice as a continuous tubular film which is quenched, collapsed, heated and stretched to effect orientation of the molecules thereof and then cooled. Stretching of the continuous tubular film is generally achieved by inflating the same with a gas, such as air, which is contained or trapped within the tubular film between pairs of longitudinally spaced nip rolls.

The introduction of a gas into a continuous tubular film may be achieved, for example, by inserting an inflating needle into a section of the film extending between the pairs of spaced nip rolls and expanding the film to a desired diameter. Once the inflating needle is withdrawn and the punctured film section is advanced beyond the pairs of nip rolls, a bubble of gas remains trapped between the spaced pairs of nip rolls.

This inflation procedure is impractical, if not impossible, at film production speeds of 50 to 300 feet per minute, which are common in the industry, and does involve interruption in an otherwise continuous operation and damage to some of the film which is produced. Moreover, some escape of gas from this trapped bubble is occasioned during the stretching operation. Therefore, the volume of the trapped gas will progressively become smaller during the stretching operation and the resulting stretched tubular film will be nonuniform in both thickness and orientation along its length. Ultimately, this trapped bubble of gas will need to be replenished and thus again involve an interruption in the operation and damage to the film.

The disadvantage of the above-described procedure can be avoided by employing an arrangement as shown in U.S. Pat. No. 2,862,234 in which a stationary tubular air probe extends inbetween a pair of nip rolls which are suitably grooved to accommodate the same.

In apparatus in which forming and stretching of a tubular film are in-line operations; that is, with the tubular film traveling along substantially the same straight path during both its formation and stretching, a probe as disclosed in the above-noted patent may be supported from the annular extrusion die. For practical reasons, such as space requirements and easier lace up, the apparatus for forming a tubular film is very often located to one side or laterally of the apparatus for stretching such film, with the film itself being conveyed along a "U-shaped" path from one operation to the other. With such arrangement of aparatus, the use of a probe as shown in the above-noted patent is possible only if the tubular film is slit immediately after it has been stretched.

Whether an air probe, as shown by the prior art, is located between nip rolls at the entrance to or exit from the film stretching apparatus, the tubular film which is being advanced through the stretching apparatus is in continuous rubbing contact with the stationary air probe and is, therefore, often marred, weakened and perhaps torn. Accordingly, a primary object of this invention is to provide a generally new or improved and more satisfactory apparatus for making oriented tubular film from thermoplastic polymeric material.

Another object is the provision of an improved apparatus for providing and maintaining a trapped bubble of gas of generally constant volume within a continuously advancing tubular film of polymeric material for stretching and orienting the molecules thereof.

Still another object is to provide an apparatus having means permitting passage of a gas through a generally collapsed portion of a tubular film as it is advanced and guided along a curvilinear path.

A further object of the invention is an improved apparatus for introducing an accurately controlled amount of gas into a continuous, advancing tubular film without rupture or damage to such film or variation in its rate of movement, and which makes little or no contact with the film itself.

These and other objects are accomplished in accordance with the present invention by an apparatus including a supply conduit for introducing a gaseous medium into a continuous tubular film of thermoplastic polymeric material as it travels between spaced pairs of nip rolls and without such conduit itself being in actual contact with the tubular film.

More particularly, in the apparatus of the present invention one end of the supply conduit is connected to a suitable source of gaseous medium under pressure, while its opposite end is free and extends toward a pair of nip rolls and is aligned with a circumferential groove formed in the periphery of at least one of such rolls. The free end of the supply conduit terminates short of the nip provided by such rolls so that the conduit itself generally makes no contact with the film which is being advanced toward and between the nip rolls. The circumferential groove which is formed in at least one of the nip rolls facilitates a slight and controlled separation of the opposing sides of the flattened tubular film, through which separation is gaseous medium may be introduced.

A sleeve is supported at only one end by the supply conduit, with its free end surrounding and spaced radially from the adjacent free end of the supply conduit. This sleeve serves primarily to maintain the supply conduit centered or aligned with the nip roll circumferential groove and, to some degree, as a seal which minimizes the escape of gaseous medium during its introduction by the supply conduit. More particularly, the centering sleeve is of rigid construction but is formed with resilient or flexible portions at its free end which extend into the nip roll circumferential groove and slidably contact with the inside surface of the tubular film as it moves inbetween the nip rolls.

Of importance is that the centering sleeve does not extend into the nip formed by the film flattening rolls. Actually, the free end of this sleeve needs to project into the nip roll circumferential groove only a slight distance, sufficient to insure that the sleeve performs its desired centering function without necessarily completely separating the opposing portions of the flattened film in the vicinity of such nip roll groove. The area and pressure contact between the sleeve and inside surfaces of the advancing film will thus be minimal. Moreover, since the sleeve portions projecting into the nip roll groove are resilient, they are capable of readily flexing or yielding, as for example in response to variations in film thickness and/or tension, and thus avoid damage to such film.

Preferably, the resilient sleeve portions are formed by providing the free end of the sleeve with a plurality of spaced, longitudinally extending slits. At least the free end of the sleeve must exhibit a low coefficient of friction, so as to allow the tubular film to slide relative thereto with ease and without risk of being damaged, and is preferably formed of polytetrafluoroethylene resin (Teflon).

The apparatus of the present invention is employed with conventional tubular film extrusion apparatus which includes a die having an annular orifice for extruding a molten thermoplastic polymeric material as a continuous tubular film, means for quenching the extruding tubular film, and preferably, but not necessarily, a mandrel supported from the die for sizing the film prior to and/or during the quenching thereof. In such arrangement, the gaseous medium supply conduit of the apparatus of the present invention is supported at one end from the die and within the confines of its annular extrusion orifice. If a mandrel is present, such conduit would extend therethrough and terminate just above the one pair of nip rolls as heretofore described.

In an arrangement in which the film-forming and stretching apparatus are in-line, spaced pairs of nip rolls would extend laterally across the longitudinal axis of the extrusion die, with inflation and orientation of the quenched tubular film occurring as such film passes from between one such pair of nip rolls and travels to the other of such pair of nip rolls.

On the other hand, if stretching and orientation of the tubular film is to be effected at a location offset laterally from the path of film extrusion, the apparatus of the present invention further includes means for guiding the film as it is conveyed from one to the other of such pairs of nip rolls, and an additional pair of nip rolls. Such guide means includes a pair of spaced frames, each preferably having a series of idler or driven rolls which engage with the at least partially flattened tubular film and minimizes its expansion by the gaseous medium contained therein, and a roller having at least one and preferably a series of circumferential grooves which permit the contained gaseous medium to travel with the tubular film as it moves toward the other of such pair of nip rolls. The rolls of this latter pair of nip rolls are mounted for selective separation so that the gaseous medium within the flattened tubular film may pass therebetween and be contained by the additional pair of nip rolls mentioned above.

For a greater understanding of this invention, reference is made to the following detailed description and drawing in which:

FIG. 1 is a diagrammatic side view illustrating the apparatus of the present invention in use;

FIG. 2 is a fragmentary vertical section through a portion of the apparatus of the present invention; and FIG. 3 is a side view of one element of the apparatus of the present invention.

Illustrated in FIG. 1 is a conventional die 13 into which molten thermoplastic polymeric material is delivered by a feed line 15 from a suitable source, not shown. The die 13 is formed with an annular orifice through which the molten thermoplastic material issues as a continuous tubular film 17 which is quenched, as by cool air impinged against the outer surface thereof from air rings 19. Preferably, but not necessarily, the tubular film 17 is sized as by an internal mandrel 21, which may be constructed and operated as disclosed in my U.S. Pat. 3,280,429. Air may be supplied to the mandrel 21 through a conduit 23 and is vented, along with other gaseous mediums, from the tubular film by conduit 25, as more fully described in my above-noted patent.

The quenched tubular film 17 is collapsed by a pair of nip rolls 27 and 29, both of which are positively driven in the directions as indicated by arrows. At least one and preferably both of the nip rolls 27 and 29 are provided, about midway between its ends, with a circumferential groove 31, desirably of V shape cross-section.

A conduit 33 is supported at one end by the die 13 and is connected by a pipe 35 to a source of air or other gaseous medium under pressure. This conduit 33 extends through the mandrel 21 with its free end aligned with nip roll grooves 31 and located above the nip formed by rolls 27 and 29, as shown in FIG. 2.

Fixed at one end to the conduit 33 is a sleeve 37, the free end of which surrounds and is spaced radially from the free end of the conduit 33. The free end of the sleeve 37 also terminates above the nip formed by the rolls 27 and 29 and projects into the aligned nip roll grooves 31 where it serves primarily to maintain the free end of the conduit centered or aligned with the nip roll grooves. Since such centering sleeve 37 contacts with the inside surface of the advancing tubular film 17 as it is being collapsed, the sleeve 37, or at least its free end, is preferably formed of polytetrafluoroethylene resin (Teflon) to facilitate smooth sliding movement of the film relative thereto and thus avoid scoring or tearing thereof. The sleeve 37 is of generally rigid construction and is provided at its free end with at least two and desirably a series of diametrically opposed slits 39 which extend longitudinally thereof. Portions 41 of sleeve 37 between the slits 39 are resilient or flexible and thus are capable of yielding toward each other in response to variations in film thickness and/or tensions.

The free end of the sleeve 37 needs to project into the nip roll grooves 31 a distance which is sufficient only to insure that it satisfactorily maintains the free end of the conduit 33 properly centered within the nip roll grooves 31. Portions of the film 17 must, of course, be separated from each other during travel of the film between the nip rolls 27 and 29 to facilitate the passage of the gaseous medium which is delivered by the conduit 33. The presence of the free end of the sleeve 37 in the nip roll grooves 31 will encourage separation of such film portions but is not actually relied upon to provide this effect. Instead, the necessary film separation is brought about by the gaseous medium which is injected into the tubular film 17 by the supply conduit 33.

More particularly, the gaseous medium issues from the conduit 33 under pressure as a rather fine stream so as to minimize the size of the grooves 31 which are necessary in the nip rolls 27 and 29 and to effectively separate the portions of the flattened film in the vicinity of such nip roll grooves. Obviously, direction of this fine stream of gaseous medium must be accurately controlled and thus explains the important function performed by the centering sleeve 37. Under a pressure sufficient to provide for the desired expansion of the tubular film 17 during a subsequent stage of this method, as hereafter described, the gaseous medium readily passes between the separated portions of the film and into the tubular film which has already been advanced beyond the nip rolls 27 and 29. In actual practice of the method of the present invention, satisfactory results have been achieved by injecting air under a pressure of from 20 to 30 pounds per square inch through a conduit 33 having an inside diameter of ⅛ inch and supporting a centering sleeve 37 having an outside diameter of ¾ inch.

Once beyond the nip rolls 27 and 29 the tubular film 17 travels in a generally lateral direction between guides 43 which engage and minimize expansion of such film by the gaseous medium which may be contained therein. Each of the guides 43 consists of a supporting frame 45 having a series of closely spaced rolls 47 which are positively advanced or driven by the movement of the film itself.

Upon leaving the guides 43, the film 17 is laced about a roll 49 and is directed upwardly along a generally vertical path into a nip provided by rolls 51 and 53. The roll 49 is formed with one and preferably a series of circumferential grooves 55 of concave cross-section so that opposing portions of the flattened film 17 passing over such roll 49 may separate, as shown in FIG. 3, under the pressure of the gaseous medium which may be contained. This separation between such opposing film portions thus permits free passage of gaseous medium contained along with the film 17 during its travel about the roll 49.

The nip rolls 51 and 53 are driven by suitable means, not shown, and in their positions shown in FIG. 1, permit the film to pass upwardly through air rings 57, 59 and 61 and inbetween nip rolls 63 and 65. At least the nip roll 51 is rotatably carried by slide blocks 67 which in turn are adapted to be urged along guides 69 by a hydraulic means 71. Thus, the nip roll 51 may be selectively moved to and away from its position shown in FIG. 1 to permit a desired volume of gaseous medium, which is delivered by the conduit 33, to flow within the advancing film 17 and be trapped therein as a bubble 73 between the nip rolls 51 and 53 and the nip rolls 63 and 65.

As the tubular film 17 travels beyond the nip rolls 51 and 53 its periphery is impinged by heated air delivered by the air ring 57. Spent air is exhausted through the air ring 59, passed through a duct 75 to a heater and blower 77 and then recirculated through the air ring 57.

Obviously, the discharge of gaseous medium from the conduit 33 and separation of the nip rolls 51 and 53 need be effected only when it is required to bring the bubble 73 to a desired size. When this has been achieved, the nip rolls 51 and 53 are again urged into position as shown in FIG. 1 and the delivery of gaseous medium through the conduit 33 is stopped. At such time, excess gaseous medium which is within the tubular film 17 traveling from the nip rolls 27 and 29 to the nip rolls 51 and 53 if under sufficient pressure, may separate the portions of the film 17 in the vicinity of the nip roll grooves 31, pass through the slits 41 in the centering sleeve 37 and be vented through the conduit 25.

As in conventional tubular film orientation methods, the air discharged from the air ring 57 is designed to heat the tubular film 17 to above its second order phase transition temperature but below its first order phase transition temperature so as to provide for stretching of such film by the trapped or contained bubble of gaseous medium and orientation of the molecules thereof. If necessary, additional heating means, such as infrared lamps, not shown, may be provided to assist the impinging heated air in elevating the tubular film to a desired orientation temperature during its passage beyond the nip rolls 51 and 53 and toward the nip rolls 63 and 65. The selective separation of the rolls 51 and 53, to initially provide a desired trapped bubble as gaseous medium between such rolls and the nip rolls 63 and 65 or to replenish such bubble, may be effected at any time without interruption in the travel or damage to the film 17.

Prior to passage of the now stretched and oriented film 17 between the nip rolls 63 and 65, the film is cooled, as by chilled air impinged against its periphery by the air ring 61. Beyond the nip rolls 63 and 65, the film 17 may be collected in roll form either before or after slitting or may be passed directly to further treatments, such as heat-setting or relaxation stages.

It is to be understood that changes and variations may be made without departing from the spirit and scope of the invention as defined in the appended claims.

I claim:

1. Apparatus for containing a gaseous medium within a continuous tubular film including spaced pairs of nip rolls between which a tubular film is adapted to be advanced, a circumferential groove formed in the periphery of at least one roll of only one of said pairs of nip rolls, a gas supply conduit having a free end aligned with the nip roll circumferential groove and terminating short of the nip provided by said one pair of rolls, means for delivering a gas under pressure into said conduit, a sleeve fixed at one end to said conduit and having a resiliently deformable free end surrounding and spaced radially from the free end of said conduit, said free end of said sleeve being formed of material having a low coefficient of friction and projecting into the nip roll circumerential groove for slidably engaging with the internal surface of the tubular film as it is advanced toward the nip provided by said one pair of rolls for maintaining the gas supply conduit centered with the nip roll groove, the resilient free end of said plastic sleeve being radially deformable and thus capable of distorting in response to variations induced by the tubular film.

2. Apparatus as defined in claim 1 wherein the free end of said sleeve is longitudinally slotted to impart resilience thereto.

3. Apparatus as defined in claim 2 wherein said sleeve is formed of polytetrafluoroethylene resin.

4. Apparatus as defined in claim 1 further including a die having an annular die orifice for extruding a molten thermoplastic material as a continuous tubular film, means for quenching the extruded tubular film, and wherein said conduit is supported by said die and within the confines of its annular orifice.

5. Apparatus as defined in claim 4 wherein said pairs of nip rolls are disposed in laterally offset relationship, and further including guide means positioned between said pairs of nip rolls, means for separating the rolls of said other pairs of nip rolls, and a further pair of nip rolls generally aligned with and spaced from said other pair of nip rolls, said guide means including a pair of opposing spaced frames which engage with a tubular film and minimize expansion thereof by the gaseous medium contained therein, and a guide roller having at least one circumferential groove formed along the perihery thereof, said guide roller positioned between said frames and said other pair of nip rolls.

6. Apparatus as defined in claim 5 wherein said opposing spaced frames each include a plurality of idler rolls and further including means for heating the tubular film during its passage between said other and additional pairs of nip rolls.

7. Apparatus as defined in claim 5 wherein the free end of said sleeve is longitudinally slotted to impart resilience thereto.

8. Apparatus as defined in claim 7 wherein said sleeve is formed of polytetrafluoroethylene resin.

References Cited

UNITED STATES PATENTS

| | | | |
|---|---|---|---|
| 2,862,234 | 12/1958 | Gerber | 264—95X |
| 2,916,764 | 12/1959 | Gerber | 18—14(S)X |
| 3,166,616 | 1/1965 | Bild et al. | 18—14(S)X |
| 3,170,012 | 2/1965 | Stinchcombe | 18—14(S)X |
| 3,300,555 | 1/1967 | Bild et al. | 18—14(S)X |
| 3,317,951 | 5/1967 | Hureau | 18—14(S)X |
| 3,492,386 | 1/1970 | Ohmasa et al. | 18—14(S)X |

J. SPENCER OVERHOLSER, Primary Examiner

R. L. SPICER, JR., Assistant Examiner